UNITED STATES PATENT OFFICE.

BERTRAM G. WORK, OF AKRON, OHIO.

PROCESS OF TREATING RUBBER.

SPECIFICATION forming part of Letters Patent No. 598,550, dated February 8, 1898.

Application filed April 17, 1897. Serial No. 632,670. (No specimens.)

*To all whom it may concern:*

Be it known that I, BERTRAM G. WORK, a citizen of the United States, residing at Akron, in the county of Summit and State of Ohio, have invented a new and useful Improvement in Processes of Treating Rubber, of which the following is a specification.

My invention relates to an improved process of treating india-rubber for the purpose of enabling it while in its unvulcanized condition to be handled without the necessity of employing mandrels, formers, or other similar supports of a mechanical nature. It is well known that india-rubber when in its unvulcanized state is exceedingly elastic, pliable, and tacky, and particularly when in thin sheets or in tubes is troublesome to handle. It is also known that the successful working up of india-rubber into tubular or other hollow shapes involves the use of mandrels, formers, &c., for internal support. The production of an endless tube out of rubber, where the tube is covered with a fabric in any form, has heretofore involved the formation of a straight tube or flat strip, the covering of this tube or strip with the fabric, and the bringing together and joining of the ends or ends and edges both of the tube and the fabric, and subsequent inflation of the partially-completed endless tube against the inclosing fabric for the purpose of permitting the tube to be finally completed and vulcanized. Where a tube has been made in the first instance, it has been necessary to build it up on an internal rod or mandrel and to remove it from this mandrel before joining the ends. In the making of hollow articles it has been found impracticable heretofore to produce them complete where a specific internal form is required, as in the case of foot-balls and the like, owing to the impossibility of withdrawing the internal former or mandrel.

My invention is directed to an improvement in the art of handling rubber, with particular reference to enabling the rubber to be manipulated in any desired form or shape for the purpose of the further covering of the rubber structure with fabric, &c., which method shall render unnecessary the use of any internal former or mandrel.

To this end my invention consists in subjecting the rubber in any shape desired to an action which shall serve to give to the rubber an inherent abnormal rigidity, this rigid or stiffened condition being caused to continue for the period of time necessary for the further manipulation of the article.

My invention further consists in combining with the rubber the requisite vulcanizing agents, forming it into the desired shape or form, and then subjecting it to an action which shall serve to stiffen the rubber and retain it in its stiffened condition a sufficient time for further manipulation, and then to vulcanize the finished product.

I have found as one, and as I consider it the best, method of giving to rubber the desired condition of rigidity that the rubber subjected to a low temperature, preferably below zero Fahrenheit and in some cases to a temperature as low as from 5° to 20° below Fahrenheit, will in a reasonably short time become sufficiently rigid—that is, fairly hard or unyielding and unpliable—and of greatly-impaired elasticity, that it will retain this condition for a considerable time, depending upon the low degree of the temperature at which it is treated and the atmospheric temperature to which it is subsequently exposed, and that when it is allowed to relax, as by thawing, it recovers the attributes of softness, pliability, and elasticity which it possessed before being frozen. The rubber will freeze at a temperature considerably above zero Fahrenheit, and this higher temperature may be employed, if desired; but the higher the temperature the slower is the rate of freezing, and I therefore prefer the lowest available temperature.

I have found particular use for the invention here described in the production of hollow articles which are covered with fabric, such as pneumatic tires for bicycles, foot-balls, and the like. In the manufacture of hollow rubber tires, particularly the single-tube variety, it has heretofore been deemed necessary to build up the tire—that is to say, to apply the various layers of rubber and fabric constituting the wall upon a straight mandrel, then to withdraw the mandrel and to bring together and join the ends of the tube and layers of fabric, &c., applied thereto, and then to vulcanize either under internal air-pressure or in some other method by which the intended cross-sectional shape of the tube shall be preserved. In some cases instead of forming the tire upon a straight mandrel and in the form of a tube it has been built up on a drum in the form of a flat band and the edges brought together and jointed to form a tube. By the method which involves the utilization of the invention covered by this application the rubber tube which is to be covered may be placed in a mold and expanded by internal air-pressure to the shape of the mold and then subjected to any desired or appropriate treatment, by which the rubber of the inner tube shall become for a temporary period inherently rigid, as by subjecting it, as described, to a sufficiently low temperature for the necessary period of time. Upon removal from the mold in which it is frozen under internal air or other fluid pressure, if this be the method practiced, the tube is found to be stiff, non-pliable, and non-elastic, and in this condition it can be covered with the various forms of fabric and further layers of rubber or other material which it may be desired to apply to the tube for a covering therefor. The rigidity of the tube is for all practical purposes the same as if it were placed upon an internal core or mandrel, and if the freezing temperature be sufficiently low and the temperature of the room in which the further manipulation takes place is not too high it will retain its stiff, non-pliable, and non-elastic condition sufficiently long for all further handling. The tube then may be vulcanized in the usual manner with or without permitting it in the meantime to thaw out.

For the production of foot-balls and the like an entirely similar proceeding is practiced, the rubber in the shape of a ball being preferably frozen under internal air or other fluid pressure against an external mold and then removed and covered with leather or other fabric while in its condition of temporary rigidity and subsequently vulcanized, if desired.

What I claim as new, and desire to secure by Letters Patent, is—

1. The method of preparing india-rubber for further manipulation, which consists in forming the rubber into hollow shapes, and thereupon giving to the rubber a condition of temporary inherent abnormal rigidity, substantially as described.

2. The method of forming covered articles out of rubber, which consists in forming the rubber into the desired shape, then giving to it a condition of inherent abnormal rigidity, and applying a permanent covering to it while in its rigid condition, substantially as described.

3. The method of forming covered articles out of rubber, which consists in forming the rubber into the desired shape, freezing it, and applying a permanent cover to it while in its frozen condition, substantially as described.

4. The method of handling india-rubber for the production of hollow articles, which consists in forming the india-rubber into the shape desired in the hollow article, then giving to the rubber a condition of inherent abnormal rigidity, then covering the rubber and then vulcanizing it, substantially as described.

5. The method of producing hollow articles out of rubber which consists in placing raw vulcanizable rubber in a hollow mold, expanding it by internal pressure against the mold, subjecting the rubber in said mold to a temperature sufficiently low to stiffen the rubber, removing the rubber in this condition from the mold, and further treating it as desired, and thereupon vulcanizing it, substantially as described.

6. The method of producing endless tubular articles out of rubber, which consists in forming an endless tube of raw vulcanizable rubber, expanding said tube within a mold, producing in it, while in its expanded condition, a condition of inherent, abnormal rigidity, withdrawing it from the mold, covering it with one or more layers of fabric or rubber or both, permitting it to relax from its abnormally rigid condition, and then vulcanizing it, substantially as described.

B. G. WORK.

In presence of—
   A. O. TOGGLE,
   FLOYD N. SHELLHORN.